United States Patent [19]

Schneider

[11] Patent Number: 4,747,861
[45] Date of Patent: May 31, 1988

[54] METHOD FOR THE MANUFACTURE OF GLASS BY MEANS OF DEPOSITION FROM THE VAPOR PHASE

[75] Inventor: Hartmut Schneider, Munich, Fed. Rep. of Germany

[73] Assignee: Siemens Aktiengesellschaft, Berlin and Munich, Fed. Rep. of Germany

[21] Appl. No.: 589,593

[22] Filed: Mar. 14, 1984

[30] Foreign Application Priority Data

Jul. 7, 1983 [DE] Fed. Rep. of Germany ....... 3324539

[51] Int. Cl.$^4$ .................. C03C 25/02; C03B 19/09
[52] U.S. Cl. ..................................... 65/3.12; 65/18.2
[58] Field of Search ............. 65/3.12, 18.2, 60.8, 65/29, 157; 427/167

[56] References Cited

U.S. PATENT DOCUMENTS

| | | | |
|---|---|---|---|
| 4,229,197 | 10/1980 | Streng | 65/3.11 |
| 4,302,232 | 11/1981 | Schneider | 65/60.8 |
| 4,389,229 | 6/1983 | Jang et al. | 65/3.12 |

FOREIGN PATENT DOCUMENTS

| | | | |
|---|---|---|---|
| 5414249 | 2/1979 | Japan | 3.12/ |
| 5627452 | 6/1981 | Japan | 65/3.12 |
| 1047136 | 11/1981 | Japan | 65/3.12 |

OTHER PUBLICATIONS

C. F. Chen, "Proc. IEEE", Sep. 1974, pp. 1278-1279.
Schultz, "Applied Optics", vol. 18, No. 21, Nov. 1, 1979, pp. 3684-3693.
Abkowitz et al., "J-Non-Cryst. Solids", 1980, pp. 831-836.
Akamatsu et al., "Applied Physics Letters", vol. 31, No. 8, Oct. 15, 1977, pp. 515-517.

Primary Examiner—S. Leon Bashore
Assistant Examiner—Michael K. Boyer
Attorney, Agent, or Firm—Hill, Van Santen, Steadman & Simpson

[57] ABSTRACT

A method for depositing glass by decomposition of glass forming compounds in the vapor phase wherein a gaseous mixture of glass forming compounds is introduced into a refractory tube, and a source of heat is applied to the tube while the tube is being rotated. The source of heat is moved parallel to the axis of the tube to provide a moving hot zone therealong and at the same time to cause a conical neck portion to develop in the tube at which deposition of the glass forming compounds takes place.

4 Claims, 2 Drawing Sheets

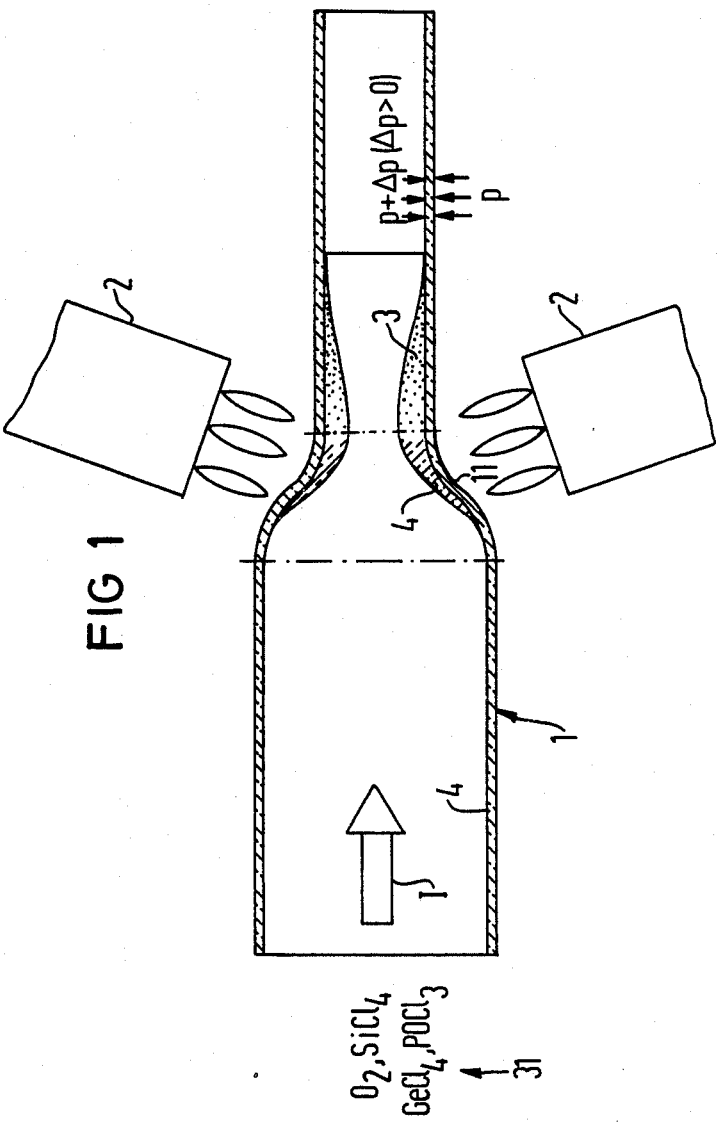

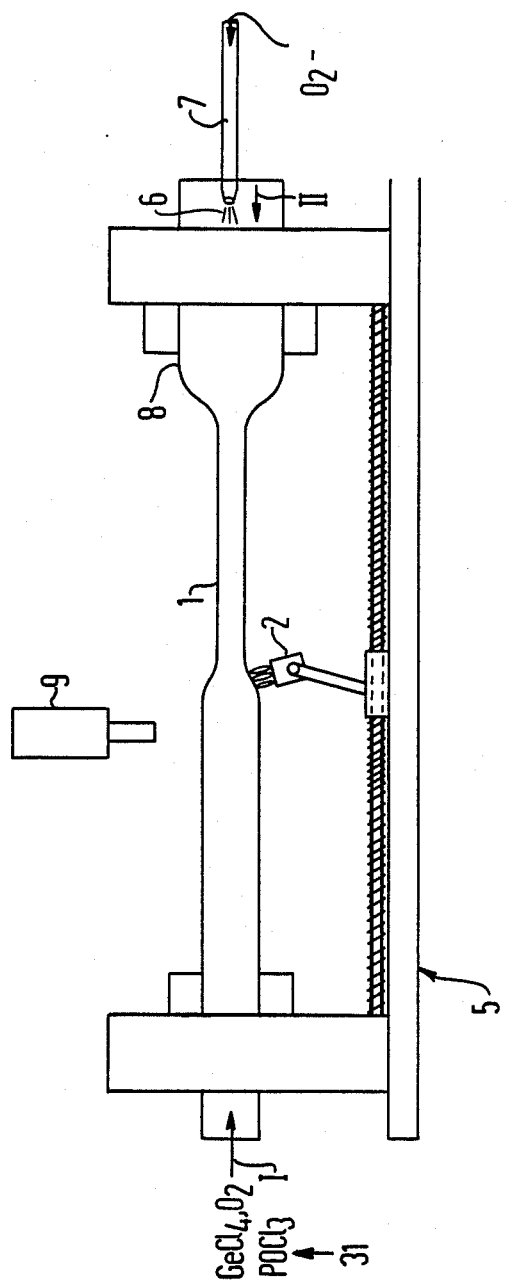

4,747,861

METHOD FOR THE MANUFACTURE OF GLASS BY MEANS OF DEPOSITION FROM THE VAPOR PHASE

BACKGROUND OF THE INVENTION

1. Field of the Invention

This invention is in the field of vapor phase deposition of glass forming compounds on the inside wall of a heated glass tube and is useful in the manufacture of optical glass fibers.

2. Description of the Prior Art

Preforms consisting of chemically pure silica glass or similar glasses are required for the manufacture of optical glass fibers which normally consist of a core and a cladding having different indices of refraction. The glasses can be modified with various dopants such as $GeO_2$, $P_2O_5$ or a silicon fluoride in order to modify the index of refraction. Since the refractive index profile of the fibers that are drawn from the preform is geometrically similar to that of the preform, the preform should already contain the desired profile.

A modified chemical vapor deposition method (MCVD) has been described in Proc. IEEE 62 (1974) pages 1278–1279 as well as in Appl. Optics, Vol. 18 (1979) pages 3684–3693. Both of these references are incorporated herein by reference for purposes of providing background.

Radial refractive index profiles that are matched to the requirements of communications technology can be achieved with this method by means of a layer-by-layer deposition of super-pure glass onto the inside of a cylindrical silica glass tube from the vapor phase. In a typical process, $SiCl_4$ together with oxygen as well as $GeCl_4$, $POCl_3$ or $SF_6$ are conducted through the tube as dopants and converted into amorphous oxides or fluorides in a hot zone. The oxides deposit downstream on the wall and are fused into glass. Layers of glass of from 10 through 25 μm are typically applied. It would be desirable for reasons of economy to deposit thicker layers per interval of time. This is rendered difficult, however, by the fact that closed pores are frequently formed when sintering or fusing thick powder layers, the closed pores later leading to the formation of bubbles, particularly when collapsing the tube into a rod. It frequently occurs, therefore, that the refractive index profile is destroyed and sometimes even the preform itself. There is an additional difficulty in that the heating of the mixture is no longer entirely successful when higher gas throughputs are used. Another disadvantage is that thick layers lead to an undesired so-called saw-toothed overall profile due to their inherent, unfavorable, inwardly decreasing refractive index profile.

Previous attempts have been made to resolve the problems of bubble formation by modifying the hot zone (see, for example, J. Non-Cryst. Sol. 38, 1980, pp. 831–836). In order to facilitate fusing, the viscosity of the glass can be lowered by means of doping with $P_2O_5$ as fluxing agent, but this deteriorates the light transmission properties of the glass. Admixture of helium is also possible to promote the powder consolidation because of its high diffusability. Glass fusing rates higher than about 0.5 g/min can only be realized, however, with accompanying disadvantages.

SUMMARY OF THE INVENTION

The present invention provides a method for the manufacture of glass by the MCVD method wherein thicker powder layers can be deposited per time interval and fused without presenting a hazard. Basically, the method involves carrying out the deposition of the glass on the inside wall of a refractory tube at a portion of the hot zone which is conical or in proximity thereto. In the preferred form of the invention, the glass tube is heated at least to the softening point of the glass in the hot zone while applying a pressure in the interior of the tube which exceeds that at the exterior. The tube is thereby expanded with the formation of a conical neck section between the newly expanded portion and the remainder of the tube. The additional pressure inside the tube can be generated by means of the stream of reaction gas mixture or by means of flowing a gas in countercurrent relationship to the reaction gas mixture from the opposite end of the tube.

In another embodiment of the present invention, the glass tube is shrunk after the deposition of one glass layer after which a conical section is again formed in the hot zone, the conical section migrating with movement of the hot zone, in preparation for the deposition of a second glass layer. This means that the tube is repeatedly expanded and shrunk.

BRIEF DESCRIPTION OF THE DRAWINGS

The invention will be further described in greater detail by reference to the accompanying drawings in which:

FIG. 1 is a longitudinal section through a funnel-shaped glass tube section schematically illustrating the glass layer being deposited; and FIG. 2 is a somewhat schematic representation of means for implementing the deposition of glass in the funnel-shaped tube.

DESCRIPTION OF THE PREFERRED EMBODIMENTS

In FIG. 1, the funnel-shaped glass tube is identified at reference numeral 1, the tube consisting of quartz glass or other highly refractory material. The tube 1 is heated by means of a pair of traveling burners 2, the burners 2 moving longitudinally in a direction substantially parallel to the axis of the tube 1. The tube 1 is also rotated during application of the heat. The burners 2 provide a hot zone which brings the temperature of the glass up to and beyond the softening temperature, thereby providing a neck down conical section 11 which is situated in or in the proximity of the hot zone created by the burners.

A reaction gas mixture required for deposition such, for example, as $SiCl_4$, $O_2$, $GeCl_4$, and $POCl_3$, flows in the direction of the arrow I through the larger cross-sectional end of the funnel-shaped tube 1. The reaction gas mixture is oxidized in the tube and reacts essentially in the conical section 11 to form a powder which deposits downstream of the conical section 11, for example, on the uncoated inside wall of the tube as a powder film 3. A positive differential pressure Δp is maintained in the tube 1 with respect to the ambient external pressure p acting on the outside wall of the tube 1. This differential pressure causes the tube 1 to be expanded in the hot zone in the softened, low-viscosity region. As the hot zone is moved to the right as seen in FIG. 1, the conical section 11 follows the hot zone created by the burners. At the same time, there is an ongoing fusion of the powder film 3 that has deposited downstream into a transparent glass layer 4. After one layer has been applied, the tube is reshrunk by means of additional heating and removal of the pressure differential.

The procedure described above is repeated for each layer to be applied. After the required plurality of layers has been deposited, the tube is collapsed into a rod in the usual manner of forming a preform for glass fibers.

The method disclosed exhibits several advantages. For one, the incoming gas mixture is more efficiently heated in the conical, relatively thin-walled tube section 11, thereby enabling higher mass throughputs to be obtained. The drift of the $SiO_2$ particles to the wall is promoted due to constriction of the gas flow in the conical neck. The sintering of the powder film expanding on or in proximity to the conical section is accelerated because the stretching promotes the pore collapse. Finally, the glass is homogenized due to the repeated expanding and shrinking of the tube. Material diffusion is promoted by the shearing flow between the layers. This leads to a smoothing of the refractive index profile and to a reduction of the light scattering of the material.

In the form of the invention shown in FIG. 2, a silica glass tube 1 is shown chucked in a glass lathe 5 and heated with an oxyhydrogen gas burner 2 to carry out the method. The gas burner 2 is supported for linear movement in the direction parallel to the axis of the tube by means of a helical screw 12. The positive pressure differential in the tube 1 is produced by means of a countercurrent gas flow consisting, for example, of oxygen gas in the direction of the arrow II and produced by means of a blowpipe 7. This generates a back-up in a gas discharge pipe 8 as described, for example, in U.S. Pat. No. 4,302,232. The tube diameter in the hot zone is detected by means of an optical diameter measuring means 9 operating on the principle of shadow measurement. The measuring means 9 controls the output of oxygen entering the heated tube and thus controls the tube diameter. Temperatures between 1750° C. and 1950° C. at pressure differentials between 100 and 5 mbar are required depending on the amount of the desired expansion ratio, which typically lies between 5% and 40%.

It should be evident that various modifications can be made to the described embodiments without departing from the scope of the present invention.

I claim as my invention:

1. A method for depositing glass by decomposition of glass forming compounds in the vapor phase which comprises:
   providing a heat-softenable refractory tube,
   introducing a gaseous mixture of said glass forming compounds into one end of said tube,
   applying a source of heat to said tube while rotating the tube, and
   moving said source of heat parallel to the axis of said tube to provide a moving hot zone therealong,
   heating said tube to at least the softening point of the tube to expand and cause the formation of a conical section of decreasing diameter which moves with the movement of said hot zone,
   maintaining the interior of said tube at a pressure in excess of the exterior pressure on said tube during such heating to thereby cause a softened portion of the tube to expand and form said conical portion, and
   forming a glass layer in said tube by deposition of decomposed glass forming compounds.

2. A method according to claim 1 wherein:
   the internal pressure in said tube is generated by means of the stream of gaseous mixture entering said tube and by introducing a gas into said tube in countercurrent flow to said stream of gaseous mixture.

3. A method according to claim 1 wherein:
   said glass tube is shrunk after the deposition of one glass layer, and said tube is expanded to form another conical section in proximity to the moving hot zone, a second glass layer is deposited over said one glass layer, and
   thereafter said tube is again shrunk.

4. A method according to claim 1 wherein: said gaseous mixture is introduced into the expanded end of said tube.

* * * * *